United States Patent
Sundholm

(10) Patent No.: US 9,933,099 B2
(45) Date of Patent: Apr. 3, 2018

(54) PIPE JOINT AND METHOD FOR FORMING THE PIPE JOINT

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 705 days.

(21) Appl. No.: 14/385,021

(22) PCT Filed: Mar. 7, 2013

(86) PCT No.: PCT/FI2013/050248
§ 371 (c)(1),
(2) Date: Sep. 12, 2014

(87) PCT Pub. No.: WO2013/135951
PCT Pub. Date: Sep. 19, 2013

(65) Prior Publication Data
US 2015/0042085 A1 Feb. 12, 2015

(30) Foreign Application Priority Data

Mar. 13, 2012 (FI) .................................. 20125268

(51) Int. Cl.
*F16L 47/03* (2006.01)
*F16L 47/24* (2006.01)
(Continued)

(52) U.S. Cl.
CPC ............ *F16L 47/24* (2013.01); *B29C 65/342* (2013.01); *B29C 66/1122* (2013.01);
(Continued)

(58) Field of Classification Search
CPC . F16L 47/24; F16L 13/11; F16L 47/03; B29C 66/1312; B29C 66/1142;
(Continued)

(56) References Cited

U.S. PATENT DOCUMENTS

| 4,530,521 A | 7/1985 | Nyffeler et al. |
| 4,718,698 A | 1/1988 | Hill |

(Continued)

FOREIGN PATENT DOCUMENTS

| CN | 201066015 Y | 5/2008 |
| CN | 102387907 A | 3/2012 |

(Continued)

OTHER PUBLICATIONS

English translation of JP H06-147386A.*

(Continued)

*Primary Examiner* — Jun Yoo
(74) *Attorney, Agent, or Firm* — Birch, Stewart, Kolasch & Birch, LLP

(57) ABSTRACT

Pipe joint, which comprises at least one first pipe section (2), and a sleeve part 5, into which the butt end part of the pipe section (2) is disposed in such a way that the sleeve part (5) extends a distance on top of the pipe section (2) from the butt end of the pipe section that is inside the sleeve, and heating means (7), such as resistance wires. For forming the joint, a joint component (3) is arranged between the outer surface (16) of at least one pipe section (2) and the inside surface (15) of the sleeve part (5), which joint component is configured to form a joint with the sleeve part (5) when the joint area is warmed with the heating means (7), and that a collar (6) is arranged on the pipe section (2), which collar comprises a detent surface (10) for the joint component (3). The invention also relates to a method for forming a pipe joint.

11 Claims, 5 Drawing Sheets

(51) Int. Cl.
*H05B 3/58* (2006.01)
*B29C 65/34* (2006.01)
*B29C 65/00* (2006.01)
*F16L 13/11* (2006.01)

(52) U.S. Cl.
CPC ...... *B29C 66/1142* (2013.01); *B29C 66/1222* (2013.01); *B29C 66/1224* (2013.01); *B29C 66/131* (2013.01); *B29C 66/1312* (2013.01); *B29C 66/5221* (2013.01); *B29C 66/52298* (2013.01); *B29C 66/7392* (2013.01); *B29C 66/73921* (2013.01); *B29C 66/742* (2013.01); *F16L 13/11* (2013.01); *F16L 47/03* (2013.01); *H05B 3/58* (2013.01); *B29C 66/71* (2013.01); *B29C 66/74283* (2013.01); *H05B 2203/014* (2013.01)

(58) Field of Classification Search
CPC ............... B29C 66/1122; B29C 66/131; B29C 66/1222; B29C 65/342; B29C 66/1224; B29C 66/5221; B29C 66/52298; B29C 66/7392; B29C 66/742; B29C 66/73921; B29C 66/71; B29C 66/74283; H05B 3/58; H05B 2203/014
See application file for complete search history.

(56) References Cited

U.S. PATENT DOCUMENTS

| | | |
|---|---|---|
| 4,836,586 A | 6/1989 | Martin |
| 5,277,456 A | 1/1994 | Mer et al. |
| 2003/0102671 A1 | 6/2003 | Fritze |
| 2013/0306187 A1* | 11/2013 | Sundholm ............ B29C 65/342 138/153 |

FOREIGN PATENT DOCUMENTS

| | | |
|---|---|---|
| EP | 0 301 864 A1 | 2/1989 |
| JP | 6-147386 A | 5/1994 |
| JP | 2003-343788 A | 12/2003 |
| JP | 2006-170262 A | 6/2006 |
| JP | 2009-036264 A | 2/2009 |
| JP | 2009-36264 A | 2/2009 |
| RU | 2 368 838 C2 | 9/2009 |

OTHER PUBLICATIONS

English translation of JP 2006-170262A.*
English translation of Office Action issued in corresponding Chinese Patent Application No. 201380013754.4 dated Aug. 19, 2015.
Extended European Search Report issued in corresponding EP Application No. 13761831.0 dated Nov. 17, 2015.

* cited by examiner

PIPE JOINT AND METHOD FOR FORMING THE PIPE JOINT

BACKGROUND OF THE INVENTION

The object of the invention is directed to a method for forming a pipe joint.

In connection with pneumatic material conveying systems, metal pipes are often used in the conveying piping. Particularly in large systems, in which the conveying distances of the material are long, the conveying pipings, more particularly the trunk pipings, can, in terms of their length, be formed into quite long, typically a number of kilometers long, conveying pipings, in which typically a number of joints must be formed between pipe sections. In these, there are often also cases in which it is desired to join metal pipe parts to a pipe part of some other material, e.g. to a pipe part of a plastic material.

In conveying pipings, particularly those formed from plastic pipes or from plastic composite pipes, bushing joints can generally be used for joining different pipe parts end-to-end to each other. The point of connection is placed into the bushing, i.e. into the sleeve part, in such a way that the ends of the pipe parts to be joined together are inside the bushing and the bushing is thus around the point of connection extending in the longitudinal direction of the pipes some distance from the point of connection in both directions. The bushing part or the section to be connected of the pipe part is provided with thermal resistors or corresponding, in which case when forming the joint electric current is conducted to the resistors, in which case the resistors heat up and a joint is formed between the sleeve part and the pipe parts. Thermoplastic pipe joints of the type described above are described e.g. in the publications U.S. Pat. No. 2,739,829, U.S. Pat. No. 4,530,521 and U.S. Pat. No. 4,906,313.

The aim of the present invention is to achieve a completely new type of solution for a pipe joint, by means of which the problems of prior-art solutions can be avoided. One important aim is to achieve a pipe joint solution applicable to the conveying pipings of pneumatic waste transporting systems. Yet another aim is to achieve a solution for conveying piping, which is formed partly from plastic material or from plastic composite material and which comprises pipe sections of other material, by means of which solution the problems of the state of the art are avoided.

Yet another aim is to achieve a solution for joining the pipe sections of conveying piping, in which solution pipe sections of different material can be used.

BRIEF DESCRIPTION OF THE INVENTION

The invention is based on a concept in which the pipe part comprises a combination containing a metallic reinforcement part, such as a steel pipe, on top of which a tubular plastic composite layer or a plastic layer is arranged. The pipe part is joined to a second pipe part by joining the plastic parts or plastic composite parts to each other directly or via a sleeve part with a plastic welding method or by gluing.

The solution according to the invention has a number of important advantages. By means of the joint according to the invention it is possible to connect a metallic pipe section end-to-end to a second metallic pipe section or to a plastic composite pipe or plastic pipe. Forming the joint is extremely easy and fast. The joint can be made by forming the joint just between the joint component and the sleeve part, in which case the metallic pipe is configured to stay in the joint area by the aid of a countersurface, such as a collar. The joint is most preferably formed by using a bushing, i.e. a sleeve part, which is disposed on the point of connection between the pipe parts in such a way that the ends of the pipe parts to be joined together are inside the bushing and the bushing is thus around the point of connection extending in the longitudinal direction of the pipes some distance from the point of connection in both directions. The bushing part is provided with thermal resistors or corresponding, in which case when forming the joint electric current is conducted to the resistors, in which case the resistors heat up and a joint forms between the sleeve part and the joint component arranged on top of the pipe parts. In one embodiment the joint component is formed from a number of parts, in which case the installation of it onto the pipe part is easy. The additive parts formed from a number of parts can be connected to each other from a fold point or hinge point, in which case in the installation phase the handling of them is easier. By arranging a collar on the pipe section, a countersurface for the joint component is achieved. On the other hand, a good opposing joint surface is achieved on the pipe sections to be joined together. The joint method to be used shrinks to some extent as it cools, in which case in one embodiment the pipe sections are pressed more tightly against each other. The additive part can extend on top of the pipe to some extent to outside the sleeve part, in which case that surface of the additive part extending to outside the sleeve can be used, before the formation and during the formation of the joint, as a base for a possible tightening tool. With the method according to the invention many different types of pipe sections can be joined to each other. On the other hand, the pipe joint is well suited for use in connection with the pipe joints of the conveying pipes of pneumatic pipe transport systems, e.g. of pneumatic pipe systems for transporting wastes.

BRIEF DESCRIPTION OF THE FIGURES

In the following, the invention will be described in more detail by the aid of an embodiment with reference to the attached drawing, wherein.

DETAILED DESCRIPTION OF THE INVENTION

Figure 1:
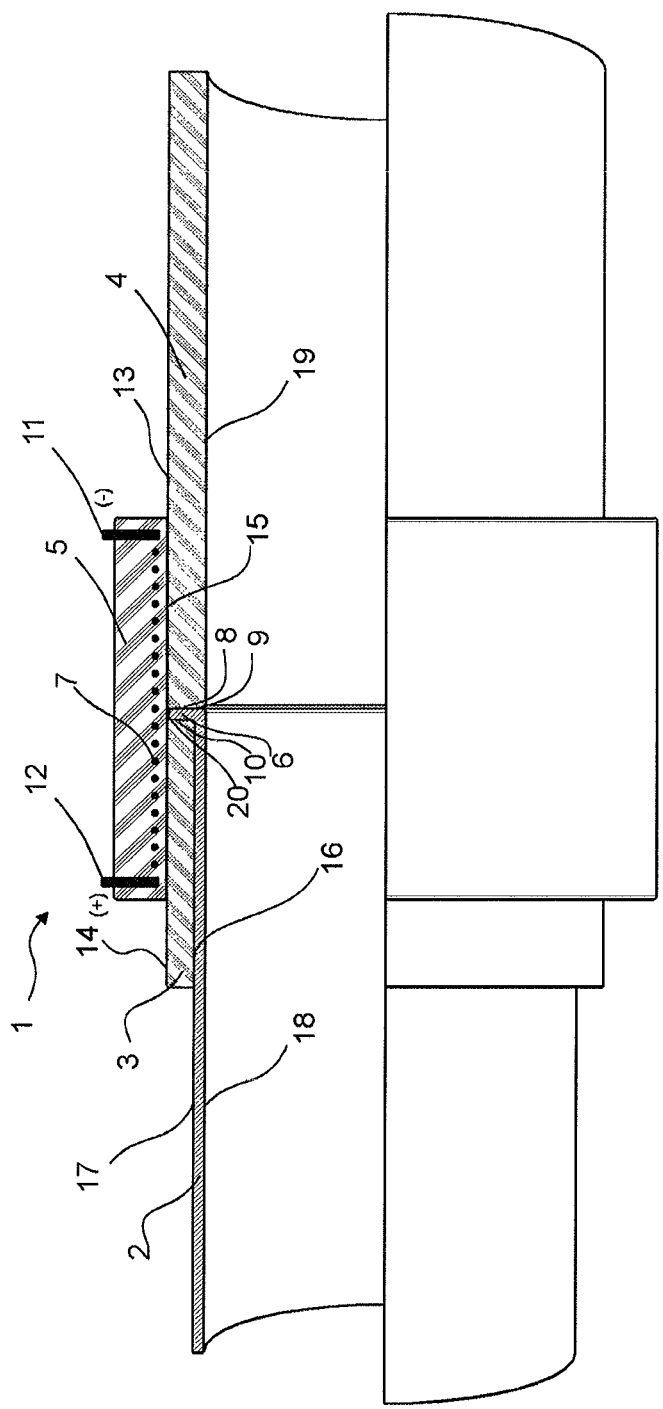
FIG. 1 presents a partial cross-section of a pipe joint according to one embodiment of the invention.

FIG. 1 presents a partially sectioned part of piping, which comprises a pipe joint 1. FIG. 1 contains a cross-section of the pipe joint 1. The pipe joint comprises two pipe parts 2, 4, which are joined together end-to-end, in which case the butt end 9 of the first pipe part 2 is against the butt end 8 of the second pipe part 4. A collar part 6 pointing outwards from the wall of the pipe in the transverse direction is formed in the butt end part of the first pipe part 2, the butt end surface of which is, in the embodiment of the figure, the butt end surface 9 of the pipe part 2. For forming the joint, a joint component 3 is arranged on the outside of the wall of the first pipe part 2.

The butt end sections of the pipe parts 2, 4 and at least partly the joint component 3 are arranged inside the bushing, i.e. inside the sleeve part 5. The sleeve part comprises resistance means 7, such as thermal resistance wires 7, which warm up when electric current is conducted into them. Connection points 11, 12 that are per se known in the art are arranged in the figure in the sleeve part, which connection points are connected to thermal resistance wires 7 and to which connection points electric current is connected. As a consequence of the heating of the resistance wires 7, a thermoplastic joint is formed, in a manner that is per se known in the art, between the sleeve part 5 and the pipe part 4 and also between the sleeve part 5 and the joint component 3 arranged on top of the first pipe part 2. In the embodiment of FIG. 1 the second pipe part 4 is, at least on its outer surface 13, plastic material, which is suited for use in a thermoplastic joint with the sleeve part 5.

In the invention the pipe part pipe part 2 comprises a joint component 3 arranged on top of it, i.e. around it. The joint component 3 typically comprises plastic material at least on its outer surface 14, which plastic material reacts to the heating of the resistance wires 7 of the sleeve part 5 and forms a joint with the sleeve part 5. The joint component 3 is arranged in FIG. 1 on the side that is away from the point of connection of the collar 6 of the pipe part 2 and the second pipe part 4 in such a way that the side surface 20 on the side of the joint of the joint component 3 is against the rear surface 10 of the collar 6. The inside surface 16 of the joint component 3 is, in the embodiment of the figures, against the outer surface 17 of the wall of the pipe part 2.

The collar 6 of the first pipe part 2 is typically, e.g. with respect to the longitudinal axis of the pipe, an essentially orthogonal collar. There are a number of alternatives for forming the collar. One typical way is to work the end of the collar with a tool and bring about the desired collar shape. The end of the pipe can e.g. initially be expanded into an angle of approx. 35-40 degrees and after that with a second expanding means into an angle of approx. 90 degrees with respect to the longitudinal direction of the pipe. Alternatively, a collar can be formed on the end of the pipe in some other way, e.g. by welding a ring-shaped part to it.

When a thermoplastic joint has been formed, as the joint cools shrinking occurs between the joint material part 3 and the sleeve part 5 as well as between the second pipe part 4 and the sleeve part 5, as a consequence of which the pipe parts 2 and 4 are pressed against each other at the joint surfaces 8, 9.

In the embodiment of FIG. 1, the wall thickness of the first pipe part 2 together with the wall thickness of the joint component 3 essentially correspond to the wall thickness of the second pipe part 4. At the joint, the external diameter of the first pipe part 2 together with that of the joint component 3 and the external diameter of the second pipe part 4 essentially correspond to each other at the point of connection. In this case a uniform sleeve part 5 in terms of its internal diameter can be used in forming the joint.

In FIG. 1 the first pipe part 2 is joined with a joint to the second pipe part 4, which in the embodiment of FIG. 1 is of plastic material. In the pipe joint 1 according to FIG. 1, the first pipe part 2 and the second pipe part 4 are thus joined end-to-end. The inside surface 18 of the first pipe part 2 and the inside surface 19 of the second pipe part 4 are essentially face-to-face, so that a sill adversely affecting material conveying does not form at the point of connection 8, 9. The outer surface 14 of the joint component 3 arranged on top of the first pipe part 2 and the outer surface 13 of the second pipe part 4 are essentially face-to-face in the joint area, so that a joint can be formed between the sleeve part 5 and the joint component 3 on the first pipe part 2 and the sleeve part 5 and the wall 4 of the second pipe part 4. The pipe parts 2, 4 are joined together by so-called electric welding. By heating the electrical resistors 7 inside the parts or in the sleeve part, a joint forms between the pipe parts and the sleeve, as is presented above.

The first pipe part 2 is typically of a material that cannot be used, as such, for forming a thermoplastic joint by the electric welding of plastics. Owing to this, a joint component 3, which in FIG. 1 is a sleeve, is arranged on top of the first pipe. The joint component according to one embodiment extends a distance, which is longer than the bushing 5, away from the point of connection, extending to outside the bushing. This section in the joint component can be utilized e.g. as a fixing surface of a tool to be used for tightening the pipe parts before the formation of the joint.

Figure 2:
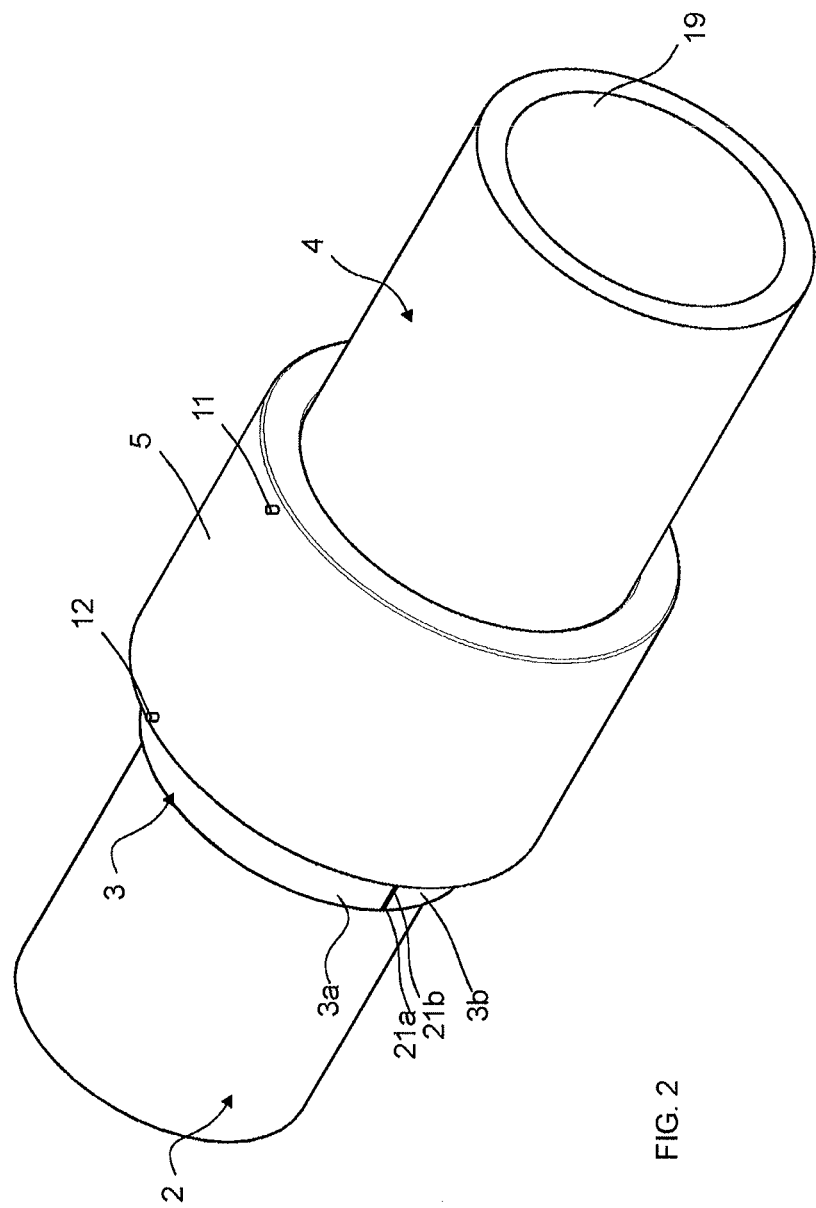
FIG. 2 presents a pipe joint according to one embodiment of the invention.

FIG. 2 presents a pipe joint according to an embodiment of the invention. Only the section of the joined pipe parts 2, 4 that is near the joint is presented. The embodiment according to FIG. 2 mainly corresponds to the embodiment of FIG. 1, but FIG. 2 shows an embodiment of the joint component 3 in which it is composed of two parts 3a, 3b.

Figure 3:
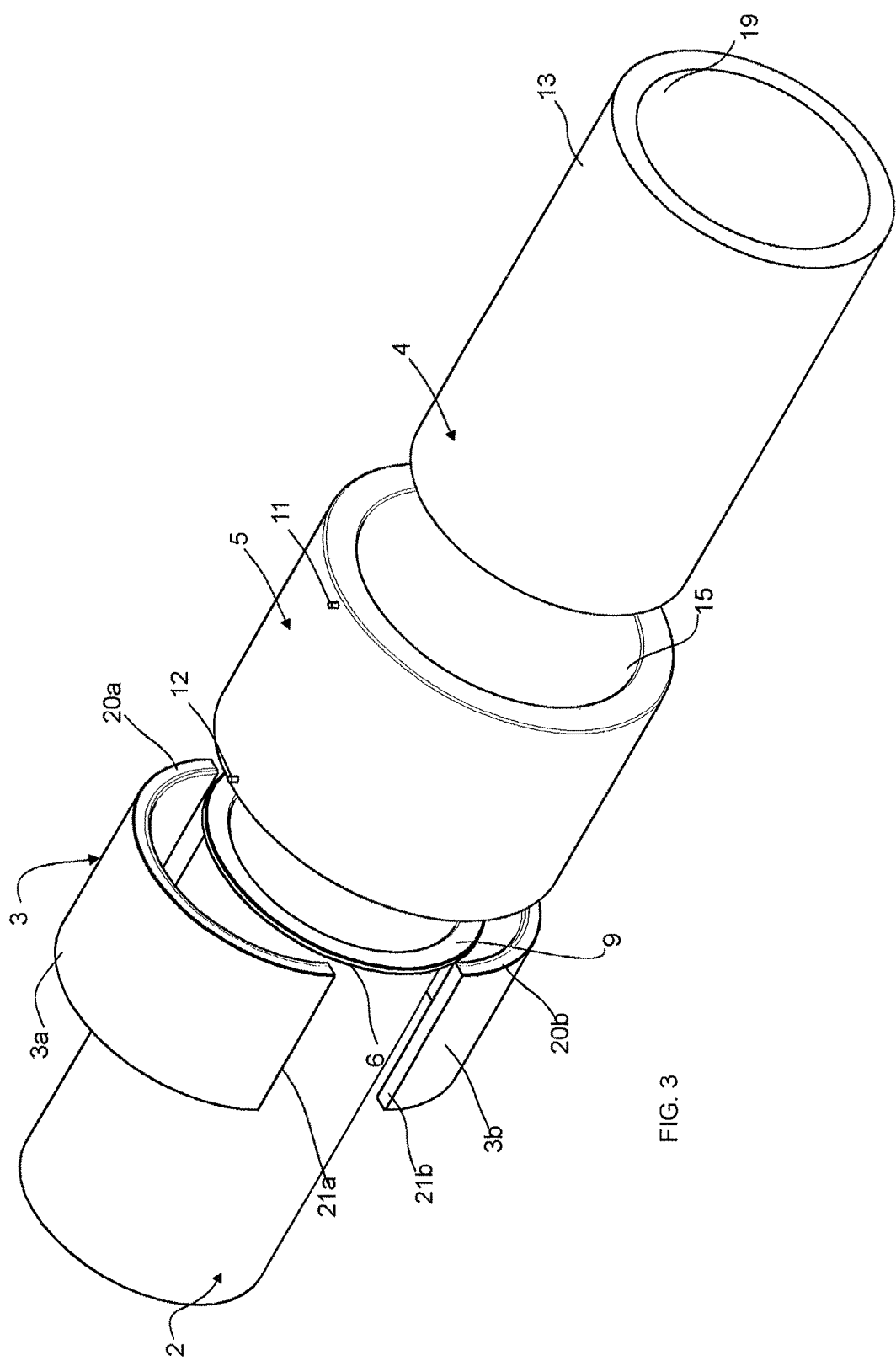
FIG. 3 presents a pipe joint according to FIG. 2 before formation of the joint.

FIG. 3 presents the joint parts of the joint of FIG. 2 before formation of the joint. The figure thus also clarifies the formation of a joint component 3 from two parts 3a, 3b, in the figure formed to be curved, which parts together form a sleeve-type joint component 3. The joint component 3 is formed from two segments, which in the figure are of equal size. The parts 3a, 3b formed by the joint component form a sleeve arranged in the proximity of the point of connection of the pipe part 2 with the butt end surfaces 21a, 21b of the parts placed face-to-face. In the embodiment of the figures, the segments 3a, 3b forming the joint component are, before the formation of the joint, separate parts from each other, but it is conceivable that they would be joined to each other, at a point disposed diametrically with respect to the butt end surfaces 21a, 21b of the figure, from a folding point or from a hinge point. The joint component can also be formed from more than two parts.

Figure 4:
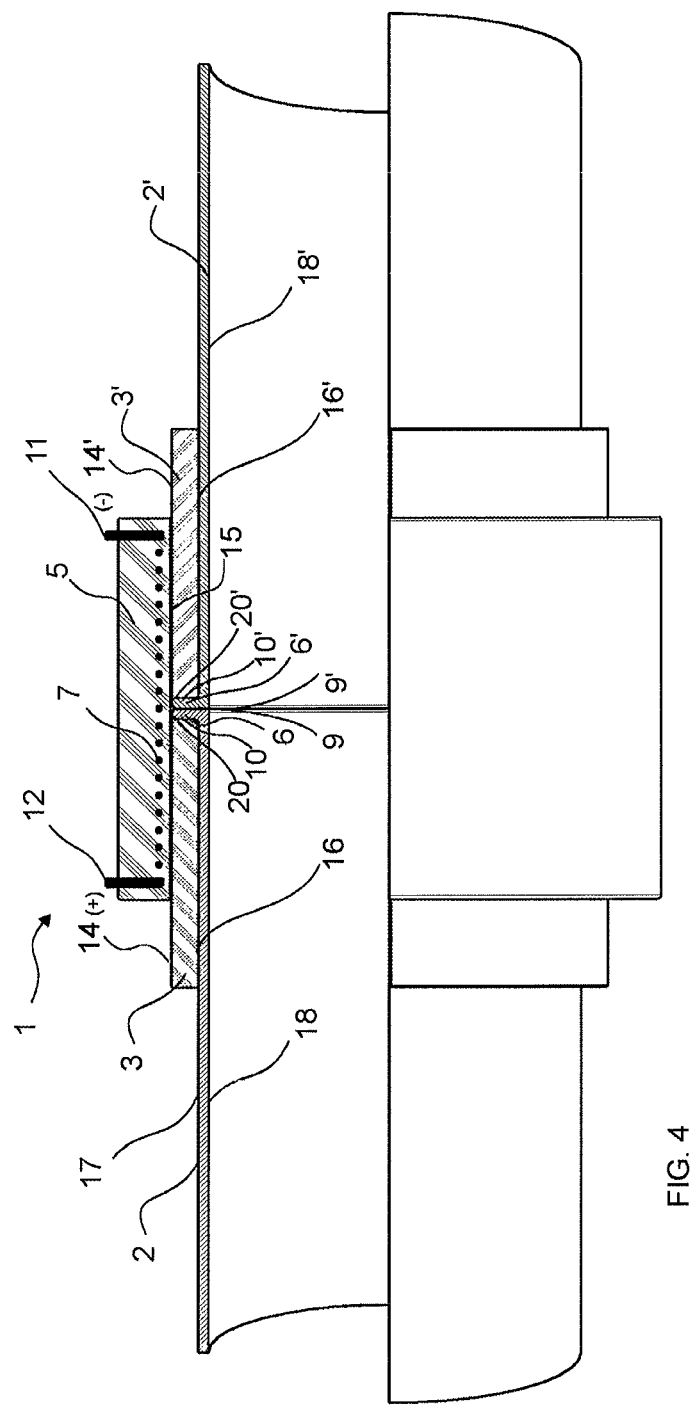
FIG. 4 presents a partial cross-section of a pipe joint according to one embodiment of the invention.

FIG. 4 presents an embodiment of the invention, wherein a joint component 3, 3' is fitted in connection with both the pipe parts 2, 2' to be joined together. FIG. 4 presents a partially sectioned part of piping, which comprises a pipe joint 1. FIG. 4 contains a cross-section of the pipe joint 1. The pipe joint comprises two pipe parts 2, 2', which are joined together end-to-end, in which case the butt end 9 of the first pipe part 2 is against the butt end 9' of the second pipe part 2'. A collar part 6 pointing outwards from the wall of the pipe in the transverse direction is formed in the butt end part of the first pipe part 2, the butt end surface of which is, in the embodiment of the figure, the butt end surface 9 of the pipe part 2. For forming the joint, a joint component 3 is arranged on the outside of the wall of the first pipe part 2. A collar part 6' pointing outwards from the wall of the pipe in the transverse direction is formed in the butt end part of the second pipe part 2', the butt end surface of which is, in the embodiment of the figure, the butt end surface 9' of the pipe part 2'. For forming the joint, a second joint component 3' is arranged on the outside of the wall of the second pipe part 2'.

The butt end sections of the pipe parts 2, 2' and at least partly the joint components 3, 3' are arranged inside the bushing, i.e. inside the sleeve part 5. The sleeve part comprises resistance means 7, such as thermal resistance wires 7, which warm up when electric current is conducted into them. Connection points 11, 12 that are per se known in the art are arranged in the figure in the sleeve part, which connection points are connected to thermal resistance wires 7 and to which connection points electric current is connected. As a consequence of the heating of the resistance wires 7, a thermoplastic joint is formed, in a manner that is per se known in the art, between the sleeve part 5 and joint component 3 arranged on top of the first pipe part 2 and also between the sleeve part 5 and the second joint component 3' arranged on top of the second pipe part 2'. In the embodiment of FIG. 4 the joint components 3, 3' are, at least on their outer surface 14, 14', of plastic material, which is suited for use in a thermoplastic joint with the sleeve part 5.

In the embodiment of the invention in FIG. 4 the pipe parts 2, 2' comprise a joint component 3, 3' formed on top of, i.e. around, each of them. The joint component 3, 3' is typically at least on its outer surface 14, 14' of plastic material, or is a fully plastic material part, which reacts to the heating of the resistance wires 7 of the sleeve part 5 and forms a joint with the sleeve part 14. The joint component 3, 3' is arranged in FIG. 4 on the side that is away from the point of connection of the collar 6, 6' of the pipe part 2, 2' in such a way that the side surface 20, 20' on the side of the joint of the joint component 3, 3' is against the rear surface 10, 10' of the collar 6, 6'. The inside surface 16, 16' of the joint component 3, 3' is, in the embodiment of the figures, against the outer surface 17, 17' of the wall of the pipe part 2, 2'.

When a thermoplastic joint has been formed, as the joint cools shrinking occurs between each joint material part 3, 3' and the sleeve part 5, as a consequence of which the sleeve 5 shrinks and the joint components 3, 3' are pressed on the side surfaces 20, 20' onto the collar 6, 6' of the pipe parts 2, 2', onto the surfaces 10, 10', in which case the pipe parts 2, 2', the joint surfaces 9, 9' of them, are pressed against each other.

In the embodiment of FIG. 4, the wall thickness of the first pipe part 2 together with the wall thickness of the joint component 3 essentially correspond to the wall thickness of the second pipe part 2' together with the second joint component 3'. At the joint, the external diameter of the first pipe part 2 together with the joint component 3 and the external diameter of the second pipe part 2' together with the second joint component 3' essentially correspond to each other at the point of connection. In this case a uniform sleeve part 5 in terms of its internal diameter can be used in forming the joint.

With the embodiments of the invention, e.g. a steel pipe 2 can be joined to a pipe 4 that is at least on its outer surface, or is wholly, of plastic material. The embodiments of FIGS. 4 and 5 present how the invention can be utilized e.g. in joining two steel pipes 2, 2' to each other.

According to one embodiment a sealing substance or a sealing means can be arranged on the joint surfaces 8, 9; 9, 9' between the first pipe part 2 and the second pipe part 2', 4 or, between the joint surfaces, before the formation of the joint.

Figure 5:
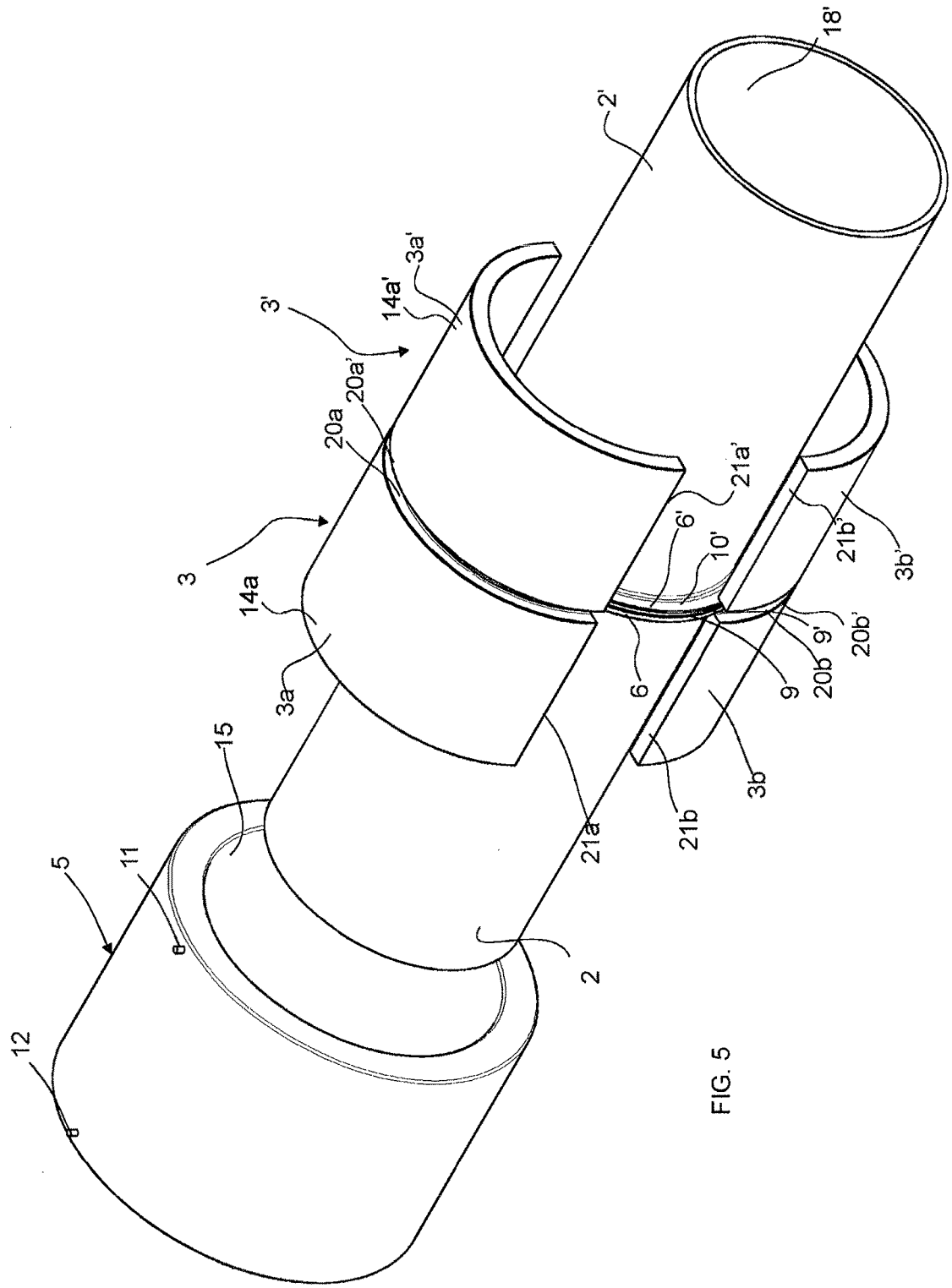
FIG. 5 presents a pipe joint according to FIG. 4 before formation of the joint.

FIG. 5 presents the joint parts of the joint of FIG. 4 before the formation of the joint. The figure clarifies that each joint component 3, 3' can be formed from two parts 3a, 3b; 3a', 3b', in the figure formed to be curved, which parts together form each sleeve-type joint component 3, 3'. In the figure each joint component 3, 3' is formed from two segments, which in the figure are of equal size. The parts 3a, 3b; 3a', 3b' formed by the joint component form a sleeve arranged in the proximity of the point of connection of the pipe part 2, 2' with the butt end surfaces 21a, 21b; 21a', 21b' of the parts placed face-to-face. In the embodiment of the figures, the segments 3a, 3b; 3a', 3b' forming the joint component are, before the formation of the joint, separate parts from each other, but it is conceivable that they would be joined to each other, at a point disposed diametrically with respect to the butt end surfaces 21a, 21b; 21a', 21b' of the figure, from a folding point or from a hinge point. According to one embodiment the joint component can also be formed from more than two parts.

The pipe part and pipe joint according to the invention are very well suited for use in the joints of the conveying piping of pneumatic pipe transport systems for waste. The pipe sizes can be rather large in diameter, e.g. typically 200-500 mm.

The object of the invention is a pipe joint, which comprises at least one first pipe section 2, and a sleeve part 5, in which the butt end part of the pipe section 2 is disposed in such a way that the sleeve part 5 extends on top of the pipe section 2 a distance from the butt end of the pipe section that is inside the sleeve, and heating means 7, such as resistance wires. For forming the joint, a joint component 3 is arranged between the outer surface 16 of at least one pipe section 2 and the inside surface 15 of the sleeve part 5, which joint component is configured to form a joint with the sleeve part 5 when the joint area is warmed with the heating means 7, and that a collar 6 is arranged on the pipe section 2, which collar comprises a detent surface 10 for the joint component 3.

According to one embodiment the pipe joint further comprises a second pipe section 2', 4, the butt end part of which is arranged against the first pipe section 2 in the sleeve part, and which is configured to form a joint with the sleeve part 5 when the joint area is warmed with the heating means 7.

According to one embodiment the pipe joint further comprises a second pipe section 2', that for forming the joint, a joint component 3' is also arranged between the outer surface 16' of the second pipe section 2' and the inside surface 15 of the sleeve part 5, which joint component is configured to form a joint with the sleeve part 5 when the joint area is warmed with the heating means 7, and that a collar 6' is arranged on the second pipe section 2', which collar comprises a detent surface 10' for the joint component 3', According to one embodiment the sleeve part 5 comprises a chamber space, into which the opposing butt ends 8, 9 of the pipe parts 2, 2'; 4 to be joined together are disposed essentially against each other in such a way that the sleeve part 5 extends a distance from the point of connection of the pipe parts 2, 2', 4 to be joined together on top of both pipe parts 2, 2', 4.

According to one embodiment the second pipe section 4 is, at least at the point of the sleeve 5 formed on its outer surface 13 from a thermoplastic material, such as from plastic.

According to one embodiment the joint component 3 is, at least on its outer surface 14, at least at the point of the sleeve 5, formed from a thermoplastic material, such as from plastic.

According to one embodiment the joint component 3 is wholly formed from a thermoplastic substance, such as from plastic.

According to one embodiment the joint component 3 is a ring-shaped part.

According to one embodiment the joint component 3 is formed from a number of pieces 3a, 3b.

According to one embodiment the first pipe section 2 is of a different material than the second pipe section 4.

According to one embodiment the first pipe section 2 is of metal, more particularly of steel.

According to one embodiment the second pipe section 2' is of metal, more particularly of steel.

According to one embodiment the collar 6, 6' is formed by working the butt end of the pipe section 2, 2'.

According to one embodiment the collar 6, 6' is formed by connecting a ring part to the butt end of the pipe.

The object of the invention is also a method for forming a pipe joint, which pipe joint comprises at least one first pipe section 2, and a sleeve part 5, into which the butt end part of the pipe section 2 is disposed, in such a way that the sleeve part 5 extends on top of the pipe section 2 a distance from the butt end of the pipe section that is inside the sleeve, and heating means 7, such as resistance wires. For forming the joint, a joint component 3 is arranged between the outer surface 16 of at least one pipe section 2 and the inside surface 15 of the sleeve part 5, and that a joint is formed between the sleeve part 5 and the joint component when the joint area is warmed with the heating means 7, and that a collar 6 is formed on the pipe section 2, which collar comprises a detent surface 10 for the joint component 3, before the formation of the joint.

According to one embodiment the second pipe section 2', 4 in addition to the first pipe section is arranged in the sleeve part in such a way that the butt end part of the second pipe section is aligned against the first pipe section 2 in the sleeve part, and that the second pipe part forms a joint with the sleeve part 5 when the joint area is warmed with the heating means 7.

According to one embodiment the second pipe section 4 in addition to the first pipe section is arranged in the sleeve part in such a way that the butt end part of the second pipe section is aligned against the first pipe section 2 in the sleeve part, and that for forming the joint, a joint component 3' is also arranged between the outer surface 16' of the second pipe section 2' and the inside surface 15 of the sleeve part 5, which joint component forms a joint with the sleeve part 5 when the joint area is warmed with the heating means 7, and in that a collar 6' is arranged on the second pipe section 2', which collar comprises a detent surface 10' for the joint component 3', before the formation of the joint, According to one embodiment the sleeve part 5 comprises a chamber space, into which the opposing butt ends 8, 9 of the pipe parts 2, 2'; 4 to be joined together are placed essentially against each other in such a way that the sleeve part 5 extends a distance from the point of connection of the pipe parts 2, 2', 4 to be joined together on top of both pipe parts 2, 2', 4.

According to one embodiment the collar 6, 6' is formed by working the butt end of the pipe section 2, 2'.

According to one embodiment the collar 6, 6' is formed by connecting a ring part to the butt end of the pipe.

According to one embodiment in the method the first pipe section is of metal, more particularly of steel.

According to one embodiment the second pipe section 2' is of metal.

According to one embodiment the second pipe section 4 is, at least at the point of the sleeve 5 formed on its outer surface 13 from a thermoplastic material, such as from plastic.

According to one embodiment the first pipe section 2 is of a different material than the second pipe section 4.

According to one embodiment the joint component 3 is formed from a number of pieces 3a, 3b.

According to one embodiment the pipe parts 2, 2', 4 are the conveying pipes of a pneumatic pipe transport system for wastes.

The joint component or the plastic material part of the second pipe preferably comprises e.g. polyethylene (PE) and/or polypropylene (PP). Also other weldable grades of plastic can come into question depending on the target of application.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A method for forming a pipe joint, comprising the following steps:
    forming at least one first pipe section (2) of metal,
    forming a sleeve part (5), into which a butt end part of the at least one first pipe section (2) of metal is disposed, wherein the sleeve part (5) extends on top of the at least one first pipe section (2) of metal a distance from the butt end of the at least one first pipe section of metal that is inside the sleeve part (5),
    providing heating means (7),
    arranging a joint component (3) between an outer surface (16) of the at least one pipe section (2) of metal and an inside surface (15) of the sleeve part (5),
    forming a joint between the sleeve part (5) and the joint component (3) when a joint area is warmed with the heating means (7), and
    forming a collar (6) on the butt end of the at least one first pipe section (2) of metal, said collar (6) comprises a detent surface (10) for the joint component (3) when the joint component (3) is arranged against the collar (6), before the formation of the joint.

2. The method according to claim 1, wherein a second pipe section (2', 4) in addition to the first pipe section is arranged in the sleeve part in such a way that a butt end part of the second pipe section is aligned against the first pipe section (2) in the sleeve part, and in that a second pipe part forms a joint with the sleeve part (5) when the joint area is warmed with the heating means (7).

3. The method according to claim 1, wherein a second pipe section (4) in addition to the at least one first pipe section is arranged in the sleeve part (5) wherein a butt end part of the second pipe section is aligned against the at least one first pipe section (2) in the sleeve part, and in that for forming the joint, a joint component (3') is arranged also between the outer surface (16') of the second pipe section (2') and the inside surface (15) of the sleeve part (5), said joint component (3') forms a joint with the sleeve part (5) when the joint area is warmed with the heating means (7), and in that a collar (6') is arranged on the second pipe section (2'), said collar comprises a detent surface (10') for the joint component (3'), before the formation of the joint.

4. The method according to claim 1, wherein the sleeve part (5) comprises a chamber space, into which opposing butt ends (8, 9) of pipe parts (2, 2'; 4) to be joined together are disposed essentially against each other in such a way that the sleeve part (5) extends a distance from a point of connection of the pipe parts (2, 2', 4) to be joined together on top of both pipe parts (2, 2', 4).

5. The method according to claim 1, wherein the collar (6, 6') is formed by working the butt end of the at least one pipe section (2, 2').

6. The method according to claim 1, wherein the collar (6, 6') is formed by connecting a ring part to the butt end of the pipe.

7. The method according to claim 1, in that in the method the first pipe section is of steel.

8. The method according to claim 1, wherein a second pipe section (2') is of metal.

9. The method according to claim 1, wherein a second pipe section (4) is, at least at the point of the sleeve (5) formed on its outer surface (13) from a thermoplastic material, such as from plastic.

10. The method according to claim 1, wherein the first pipe section (2) is of a different material than a second pipe section (4).

11. The method according to claim 1, wherein the joint component (3) is formed from a number of pieces (3*a*, 3*b*).

\* \* \* \* \*